(12) United States Patent
Wanie et al.

(10) Patent No.: US 12,491,043 B2
(45) Date of Patent: Dec. 9, 2025

(54) HOLDER FOR X-RAY MARKER AND ASSOCIATED METHOD

(71) Applicant: AJ1E Superior Solutions LLC, Jackson, WI (US)

(72) Inventors: Kyle A. Wanie, Jackson, WI (US); Andrew J. Wanie, Jackson, WI (US)

(73) Assignee: AJ1E Superior Solutions LLC, Jackson, WI (US)

( * ) Notice: Subject to any disclaimer, the term of this patent is extended or adjusted under 35 U.S.C. 154(b) by 225 days.

(21) Appl. No.: 18/140,888

(22) Filed: Apr. 28, 2023

(65) Prior Publication Data

US 2024/0189066 A1 Jun. 13, 2024

Related U.S. Application Data

(60) Provisional application No. 63/431,938, filed on Dec. 12, 2022.

(51) Int. Cl.
*A61B 90/00* (2016.01)
*A61B 6/04* (2006.01)

(52) U.S. Cl.
CPC ............ *A61B 90/39* (2016.02); *A61B 6/0492* (2013.01); *A61B 2090/376* (2016.02); *A61B 2090/3966* (2016.02)

(58) Field of Classification Search
CPC . A61B 6/0492; A61B 90/39; A61B 2090/376; A61B 2090/3966
See application file for complete search history.

(56) References Cited

U.S. PATENT DOCUMENTS

| 5,345,494 A | * | 9/1994 | Willey | A61B 90/39 |
| | | | | 378/165 |
| 5,592,527 A | * | 1/1997 | Ray | G03B 42/047 |
| | | | | 378/165 |
| 5,640,438 A | * | 6/1997 | Talluto | G03B 42/047 |
| | | | | 378/165 |
| 9,588,412 B1 | * | 3/2017 | Streete | G03B 42/047 |
| D827,828 S | * | 9/2018 | Smith | D24/158 |
| D841,815 S | * | 2/2019 | Smith | D24/158 |
| 2015/0257851 A1 | | 9/2015 | Plassky et al. | |
| 2021/0207957 A1 | * | 7/2021 | Haeusler | G06T 7/73 |
| 2021/0228310 A1 | * | 7/2021 | Bertolote | A61N 1/05 |

FOREIGN PATENT DOCUMENTS

| GB | 2440587 A | * | 2/2008 | ............ A61B 90/39 |
| WO | WO-2019105925 A1 | * | 6/2019 | ............ A61B 90/39 |

* cited by examiner

*Primary Examiner* — Mark R Gaworecki
(74) *Attorney, Agent, or Firm* — Boyle Fredrickson, S.C.

(57) ABSTRACT

A holder for the storage and utilization of X-ray markers. The holder includes one or more channels in which an X-ray marker may be slid for storage. While the marker is stored, the holder may be transported throughout a healthcare setting. The marker may then be easily removed from the holder when the marker is needed. The holder may include one or more indents in a channel to improve the ability to slide an X-ray marker. A tension mechanism within a channel holds a marker in place while it is being stored in a holder. Further, openings in the front panel of the holder may allow user to see what marker is being stored. The holder may also include thumb notches to help easily insert and remove an X-ray marker from the holder.

20 Claims, 9 Drawing Sheets

HOLDER FOR X-RAY MARKER AND ASSOCIATED METHOD

The present application claims priority to the U.S. provisional application No. 63/431,938 filed on Dec. 12, 2022.

BACKGROUND OF THE INVENTION

1. Field of the Invention

The invention relates to a holder for X-ray identification markers used by radiologic technologists and other imaging professionals in a healthcare setting. The holder improves the storage and utilization of X-ray identification markers, while also helping reduce the spread of microorganisms.

2. DISCUSSION OF THE RELATED ART

Radiologic technologists and other imaging professionals around the world utilize X-ray markers, also known as lead identification markers, to annotate medical images. X-ray markers help technologists identify which anatomical side of the body is being imaged, as well as other relevant information such as the time, date, patient position, etc. These markers are usually made of radiopaque lead letters, making the markers appear on an x-ray image, and sealed with an epoxy. Often, markers are relatively small, and may be held in the palm of a technologist's hand. X-ray markers are commonly rectangular in shape with minimal thickness.

Generally, an X-ray marker may be attached directly to an imaging plate (detector, receptor, etc.), on a wall or table "bucky", or on top of a patient. Regardless of the attaching surface, a marker may be placed in the area or field of view in which radiation passes through, also referred to as a "light field", causing the marker to show up on an X-ray image. X-ray radiation passes through the patient and the X-ray marker and hits an imaging plate. The imaging plate then digitally processes an image, showing an anatomical artifact (from the patient) and a lead artifact (from the marker).

To attach these identification markers, an imaging technologist often utilizes tape, such as Transpore clear tape, or other double-sided adhesives to attach the marker to the imaging plate or another attaching surface. Generally, personal markers are carried by each technologist throughout a healthcare facility from patient to patient. The two most common personal markers are an "L" for left and an "R" for right, both of which may be annotated with the technologist's initials. Most technologists attach their personal markers to their ID badge or a separate sheet of plastic with double-sided tape. Then the ID badge or plastic are often stored on a retractable reel or in scrub pockets.

This presents numerous problems. For one, when a technologist is working with a patient, touching their ID badge to grab their identification markers spreads germs and other bacteria between the patient and the ID badge. The same is true when a technologist reaches into a scrub pocket to grab their markers. In a hospital setting, ID badges are typically used for opening locked doors and logging into computers throughout the healthcare setting. Thus, when a technologist touches their ID badge during an exam, the risk of bacteria spreading everywhere the ID badge is used increases. Secondly, removing and pulling a marker off a thin sheet of plastic, such as an ID badge, can be difficult. This can result in the wear and tear on an ID badge and the markers themselves. Furthermore, if a technologist attempts to avoid this issue by storing the markers without attaching them to plastic or another object, such as storing the markers in their pocket, the double-sided tape on the back of the markers will remain exposed and accumulate dirt, lint, and other microorganisms. A technologist may also be prone to losing their markers due to the markers falling off their badges or falling out of their pockets. Once the markers are lost, a technologist is unable to perform their job unless spares are available.

Thus, there is a need in the market to improve the storage and utilization of X-ray markers, while maintaining high-caliber sanitation in a healthcare setting.

SUMMARY AND OBJECTS OF THE INVENTION

The disclosed invention addresses the above-identified issues and improves upon the prior art by providing an X-ray marker holder that provides efficient storage and access to X-ray markers and also helps reduce the spread of germs and bacteria. The present invention utilizes a unique sliding mechanism so that markers can easily be slid into and removed from the holder. Unlike an ID badge, the technologist may only need to touch the holder when using the X-ray markers, reducing the spreading of germs and bacteria. Furthermore, the design of the holder may allow the double-sided tape on the back of the marker to be covered without attaching the marker to another object. This may prevent the accumulation of dirt, lint, and microorganisms while also avoiding the wear and tear caused by removing an attached marker.

The holder may include one or more channels between the front and back panel of the holder. An X-ray marker may slide in and out of a channel. A channel may also include indents facing the front and back of the holder. The indents may provide spacing between the holder and the front and the back of the marker, allowing the marker to smoothly slide from the holder to a technologist's hand. The holder may also include one or more thumb notches on the top and bottom of the front and back panels exposing a portion of the top and bottom of an X-ray marker that is stored in the holder. The thumb notches may allow a technologist to push or pull a marker out of the holder. Further, the holder may include an opening in the front panel of the holder so the technologist may identify what marker is stored in the holder. Additionally, the back panel of the holder may be solid to cover and protect the double-sided tape on the back of the X-ray marker.

The holder may also include a tension mechanism within a channel. The tension mechanism may place tension on the X-ray marker while the marker is in the channel, securing the marker in place. A tension mechanism may secure the marker via a friction fit. For example, a tension mechanism may be one or more protrusions that provide a stabilizing force, such as friction, between the X-ray marker and the holder, preventing unwanted movement of the marker. In another embodiment, the tension mechanism may include two prongs extending from a base. The prongs may abut the marker when the marker is inserted in the channel to secure the marker in place.

In one embodiment, the holder may include two (2) channels to store two (2) X-ray markers. Thus, in this embodiment, a technologist may store the common "L" and "R" markers in one holder. The channels may be separated by a separating section. Additionally, two (2) openings in the front panel may allow a technologist to see which marker is in which channel.

The holder may also include one or more reel slots. The reel slots may allow a technologist to attach the holder to a retractable reel, which is often used in healthcare settings. A reel slot may be placed on any side of the holder, and multiple reel slots may be included, allowing for customization of use by the technologist. A key ring hole may also be included with the holder to allow a technologist to attach the holder to a key ring.

In one particular embodiment, a holder may include a front panel connected to a back panel. A channel may run between the front and back panels defining the interior of the holder. The channel may be sized so an X-ray marker may slide into and out of the channel. This embodiment may also include a tension mechanism that abuts the X-ray marker when the marker is inserted in the channel, securing the X-ray marker within the channel. This tension mechanism may have at least two prongs that extend from a base and abut the X-ray marker. When an X-ray marker is abutting only one prong, that prong may recess into a pocket of space surrounding the tension mechanism. Further, this embodiment may include two channels divided by a separating section. A changeable spacer may then be mounted on a center support within the separating section to reduce the width of at least one channel. The holder may include a means for detaching the front and back panels to access the center support.

An embodiment may include at least one indent in the channel facing the front or back panel. The holder may also include at least one tension mechanism within the channel, such as a protrusion, which produces a stabilizing force between the X-ray marker and the tension mechanism when the X-ray marker is in the channel.

In another embodiment, the front panel may include one or more openings connecting the interior and exterior of the holder. Further, the front panel or the back panel may include one or more thumb notches in the edge of the panels. The holder may additionally include one or more reel slots that create a hole through the holder and are separate from a channel.

One embodiment may include at least two channels and a separating section that divides the different channels. This embodiment may also include other features such as indents, openings in the front panel, tension mechanisms, thumb notches, and reel slots.

An additional embodiment may include a marking device for a medical diagnostic image having an X-ray marker and a holder. The holder may include a front panel and a back panel that are substantially parallel with a channel between the two panels defining an interior of a holder. The perimeter of the channel may have a similar shape and be marginally larger than the X-ray marker so that the marker may be inserted in and removed from the interior of the holder.

Yet another embodiment of the present invention may include a method of using an X-ray marker. An X-ray marker with a means for attaching the marker to a surface may be provided. The X-ray marker may be attached to a first surface at a first location. The X-ray marker is then removed from the first surface and inserted or slid into the holder having a channel such that the marker is secured in the channel. With the marker inside the channel, the holder may be transported to a second location. The X-ray marker may then be removed or slid out of the holder and attached to a second surface. This method may also include performing an X-ray on the first and second surfaces. The size of the channel may also be adjusted such that a second X-ray marker with different dimensions may be inserted and secured in the channel.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

Figure 1:
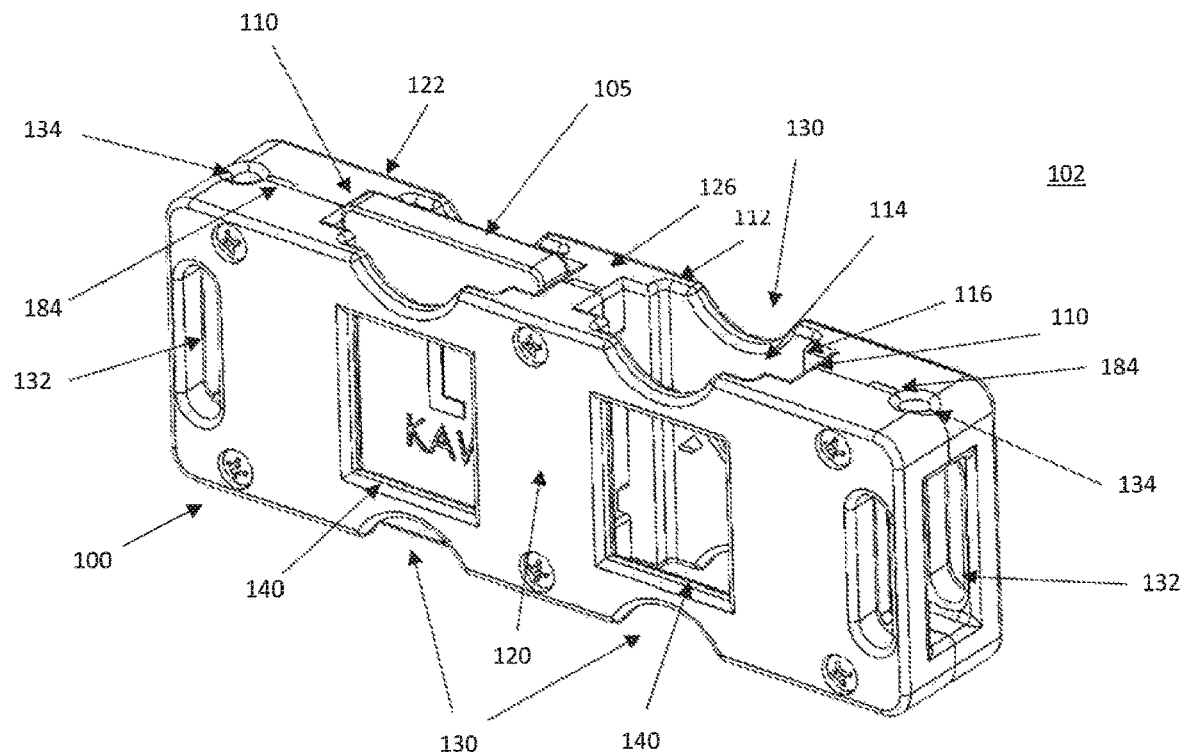
FIG. 1 depicts an isometric view of an embodiment of a marking device having a holder with two (2) channels and one X-ray marker.

Additional drawings of various embodiments of the present invention are included in the attached Appendix.

In describing the preferred embodiment of the invention that is illustrated in the drawings, specific terminology will be resorted to for the sake of clarity. However, it is not intended that the invention be limited to the specific terms so selected, and it is to be understood that each specific term includes all technical equivalents, which operate in a similar manner to accomplish a similar purpose. For example, the words connected, attached, or terms similar thereto are often used. They are not limited to direct connection but include connection through other elements where such connection is recognized as being equivalent by those skilled in the art.

DETAILED DESCRIPTION OF THE INVENTION

The present invention and the various features and advantageous details thereof are explained more fully with reference to the non-limiting embodiments described in detail in the following description.

As used herein, the terms "X-ray marker", "marker", and "lead identification marker" shall have a common meaning and may be used interchangeably. Additionally, the term "technologist" shall include, but is not limited to, all radiologic technologists, radiologists, other imaging professionals, and any other person who utilizes an X-ray marker 105.

FIG. 1 depicts an embodiment of a marking device 102 for a medical diagnostic image, which includes a holder 100 for X-ray markers 105. The holder 100 provides one or more channels 110 in which an X-ray marker 105 may be stored. The holder 100 may include a front panel 120 connected to a back panel 122. The front panel 120 and back panel 122 could be connected by one or more side walls or via some other means. A channel 110 may run between the front panel 120 and the back panel 122 and define the interior 114 of the holder 100. An X-ray marker 105 may be slid or otherwise inserted from the exterior of the holder 100 into the interior 114 of the holder 100 via the channel 110. The X-ray marker 105 may be stored in the channel 110 and the interior 114 of the holder 100 while the marker 105 is not in use. When the X-ray marker 105 is needed, a technologist may then slide or otherwise remove the marker 105 out of the channel 110 and the interior 114 of the holder 100 to the exterior of the holder 100.

The embodiment illustrated in FIG. 1 depicts a holder 100 with two (2) channels 110. The two (2) channels 110 are divided by a separating section 126. The separating section 126 may be solid or hollow and may divide the channels 110. An embodiment with two (2) channels 110 may be useful because the most common X-ray markers 105 are markers 105 with an "L" for left and an "R" for right. These "L" and "R" markers 105 are frequently used by technologists to annotate left and right on X-rays. The holder 100 shown in FIG. 1 may be useful for storing and utilizing these common "L" and "R" X-ray markers 105. While FIG. 1 depicts a holder 100 with two (2) channels 110, a holder 100 may also contain only a single channel 110. Furthermore, a holder 100 may contain more than two (2) channels 110.

In the embodiment shown in FIG. 1, a channel 110 may provide a hole through the entire height of a holder 100. In other embodiments, a channel 110 may terminate at one end. For example, a holder 100 may include a top wall or a bottom wall at the end of a channel 110.

A channel 110 may provide a space to insert an X-ray marker 105 into the interior 114 of the holder 100. The perimeter 116 of the interior 114 may be sized and shaped such that an X-ray marker 105 may slide in and out of the channel 110 with minimal clearance. For example, if an X-ray marker 105 has a rectangular cross section, the perimeter 116 of the interior 114 may also be rectangular. Furthermore, the perimeter 116 of the interior 114 may be sized to be only marginally larger than the perimeter of the X-ray marker's 105 cross section to minimize the clearance between the channel 110 and the marker 105.

Figure 15:
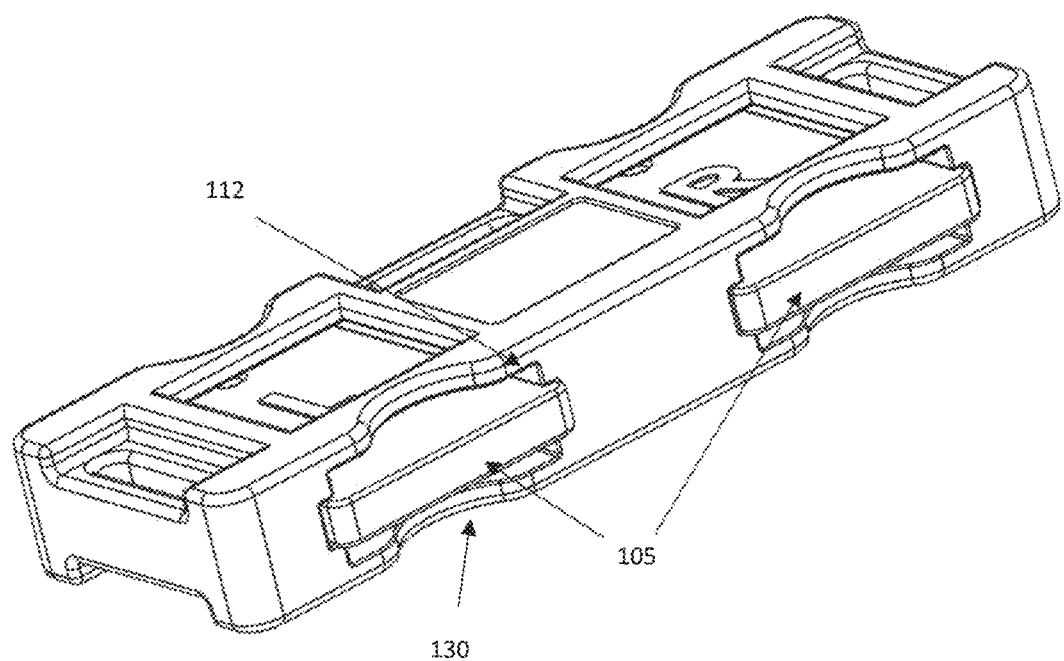
FIG. 15 depicts an isometric view of a marking device with the holder shown in FIG. 13, illustrating an indent in a channel.

Additionally, a channel 110 may include one or more indents 112, as shown in FIGS. 1 and 15. An indent 112 may project toward the front or the back of a holder 100. For example, the indents 112 may project toward the front panel 120 and the back panel 122. An indent 112 may project at a right angle. In other embodiments, an indent 112 may project in a rounded path or in some other shape.

An indent 112 within a channel 110 may create additional space in the interior 114 of the holder 100. When an X-ray marker 105 is slid into a channel 110, an indent 112 may provide a gap between the front or back of the marker 105 and the inner wall of the holder 100. This gap created by an indent 112 may be beneficial for a few reasons. First, double-sided tape is generally attached to the back side of an X-ray marker 105. The double-sided tape is often used to attach a marker 105 to an imaging plate or some other surface. A gap may prevent the tape from contacting the inner wall of the holder 100 and subsequently sticking to the inner wall. Additionally, a gap may allow an X-ray marker 105 to slide in and out of a channel 110 with more ease as a marker 105 may not contact the inner walls of the holder 100. Furthermore, the additional spacing that may be provided by the gap may allow a technologist to more easily grip the marker 105 when the marker 105 is inserted in the holder 100. In other words, the indent 112 provides clearance between the double sided tape on a marker 105 and the inner wall of the holder 100, which prevents the tape from rubbing against the holder 100. This clearance makes it easier for a technologist to insert and remove the marker 105 from the holder 100.

Figure 6:
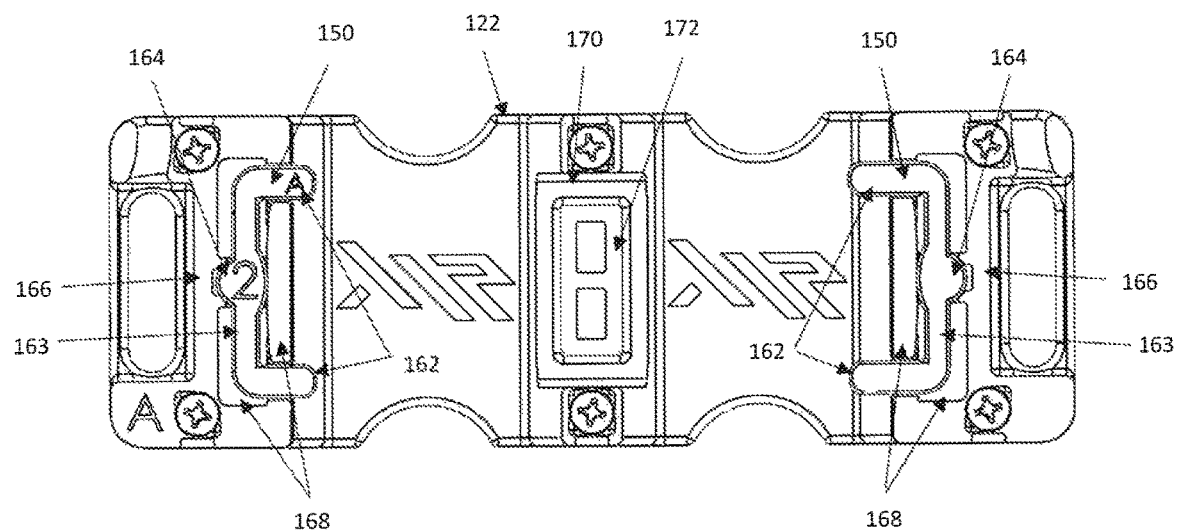
FIG. 6 depicts a front view of the interior of the holder shown in FIG. 1, illustrating the inner assembly of the back panel, two wider tension mechanisms, and a spacer mounted on a center support.
Figure 7:
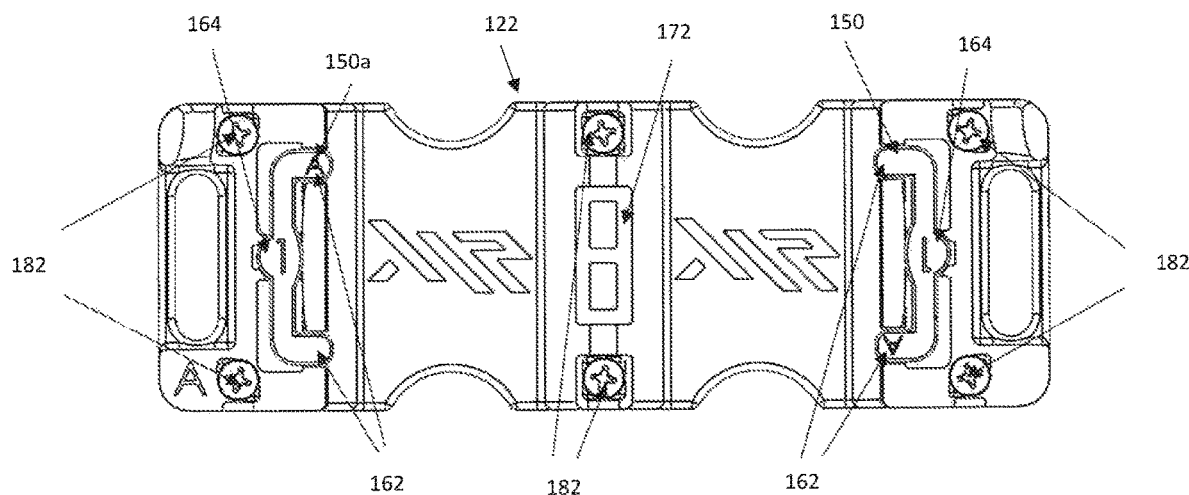
FIG. 7 depicts a front view of the interior of the holder shown in FIG. 6, illustrating the inner assembly of the back panel, two narrower tension mechanisms, and no spacer mounted on the center support.

As shown in FIGS. 6 and 7, a holder 100 may also include one or more tension mechanisms 150 within a channel 110. A tension mechanism 150 may place some stabilizing force on an X-ray marker 105 when the marker 105 is placed in a channel 110. A stabilizing force may be some tension, pressure, friction, or some other similar force that may hold or otherwise secure the marker 105 in place in the channel 110 and in the interior 114 of the holder 100, preventing any unwanted movement. Thus, a tension mechanism 150 may prevent an X-ray marker 105 from falling out of a holder 100 when the marker 105 is being stored. Additionally, a tension mechanism 150 may be included on multiple inner walls of a channel 110.

As shown in FIG. 7, a tension mechanism 150 may be included in each channel 110 of a holder 100. In one embodiment, a tension mechanism 150 may include one or more prongs 162 extending from a base 163 of the tension mechanism 150. As depicted in FIG. 7, the tension mechanism 150 may include two prongs 162 extending from opposite ends of the base 163 in an approximately parallel direction. The base 163 may also include a radius 164, which may protrude in the opposite direction of the prongs 162. The tension mechanism 150 may be surrounded by tensioner walls 168 that mirror the shape of the tension mechanism 150, such that the tension mechanism 150 fits between the tensioner walls 168, as shown in FIG. 6. The holder 100 may also include a center support 172 within the separating section 126.

Figure 9:
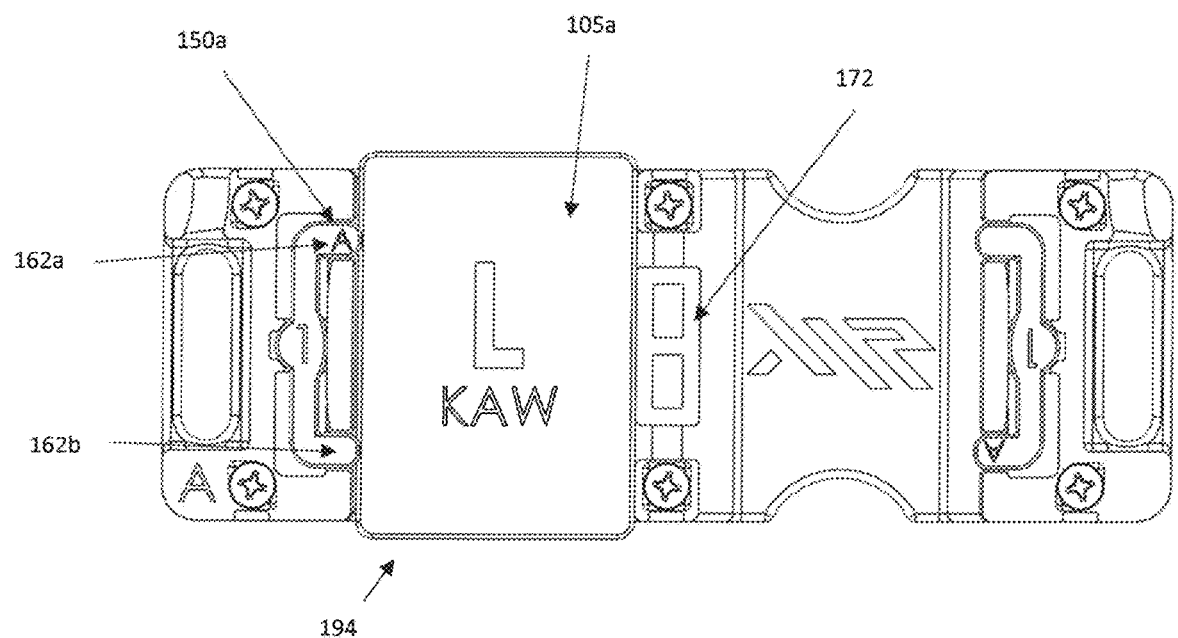
FIG. 9 depicts a front view of a marking device with the holder shown in FIG. 1, illustrating the inner assembly of the back panel with a wide marker fully inserted in a channel.

As shown in FIG. 9, when an X-ray marker 105 is fully inserted in the channel 110, the two prongs 162 abut the marker 105. The prongs 162 provide a friction fit between the marker 105 and the center support 172, securing the marker 105 in the interior 114 of the holder 100. The prongs 162 may secure the marker 105 by pushing the marker 105 against the center support 172.

Figure 10:
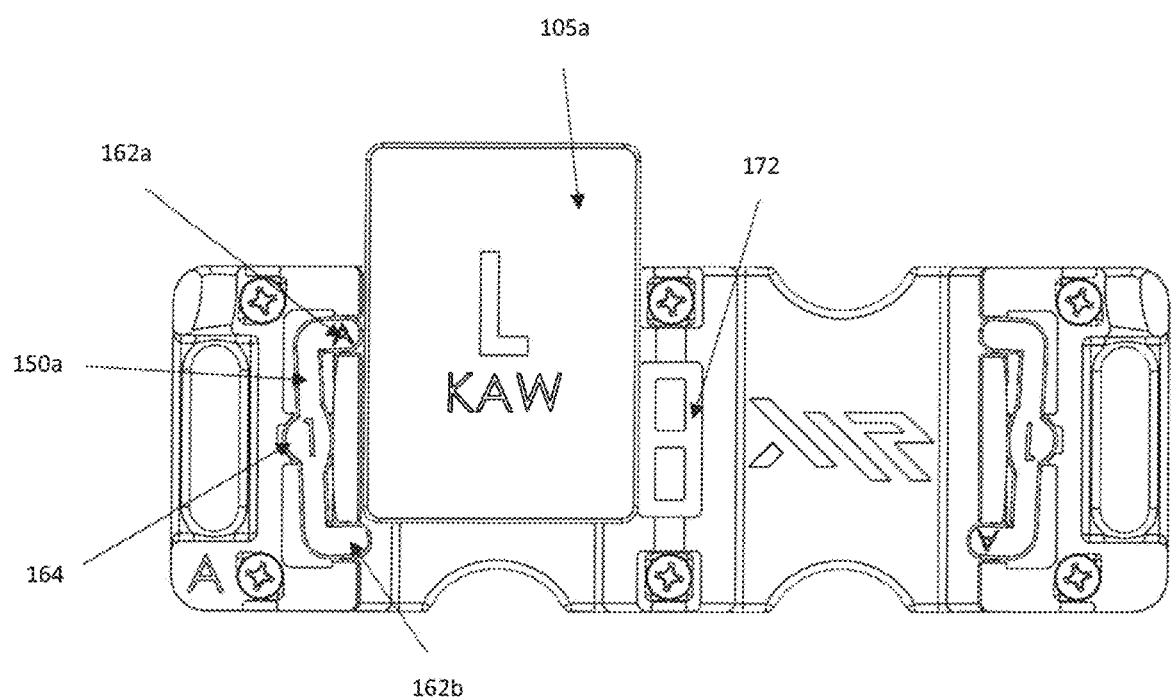
FIG. 10 depicts a front view of a marking device with the holder shown in FIG. 1, illustrating the inner assembly of the back panel with a wide marker partially inserted in a channel.

Furthermore, a gap between tensioner walls 168 and the tension mechanism 150, particularly around the radius 164, may create a pocket 166 of space. This pocket 166 of space allows the radius 164 and the tension mechanism 150 to move and rotate. As shown in FIG. 10, when an X-ray marker 105 is partially inserted in a channel 110, only a first prong 162a may abut the marker 105. This contact may cause the first prong 162a to recess within the pocket 166 of space. The recessing of the first prong 162a may cause the tension mechanism 150 and radius 164 to move and rotate, which may cause the second prong 162b to extend further into the channel 110.

The recessing of the first prong 162a may make it easier for a technologist to insert or remove a marker 105 from a holder 100. The stabilizing force that secures the marker 105 in the channel 110 is lessened when the first prong 162a is recessed as the tension mechanism 150 is not fully pushing on the marker 105. Thus, the marker 105 may slide in and out of the channel 110 with less resistance when only partially inserted.

As the X-ray marker 105 continues to be inserted in the channel 110, the marker 105 will abut the second prong 162b. This contact may cause the second prong 162b to partially recess from its previous extended position. The recessing of the second prong 162b may cause the radius 164 and tension mechanism 150 to move in the reverse direction, which may cause the first prong 162a to extend into the channel 110 out of the recessed position. This results in both the first prong 162a and the second prong 162b abutting the marker 105 and securing the marker 105 in the interior 114 of the holder 100, as shown in FIG. 9.

Additionally, one embodiment of the present invention may include the ability to adjust the size of a channel 110, so the same holder 100 may be used with a variety of different sized X-ray markers 105. Generally, X-ray markers 105 are not all one standard size, so there may be a need in the market to provide an adjustable holder 100 suitable for securing markers 105 of different sizes. The present invention may provide for this market need by including a changeable spacer 170 and interchangeable tension mechanisms 150.

Figure 8:
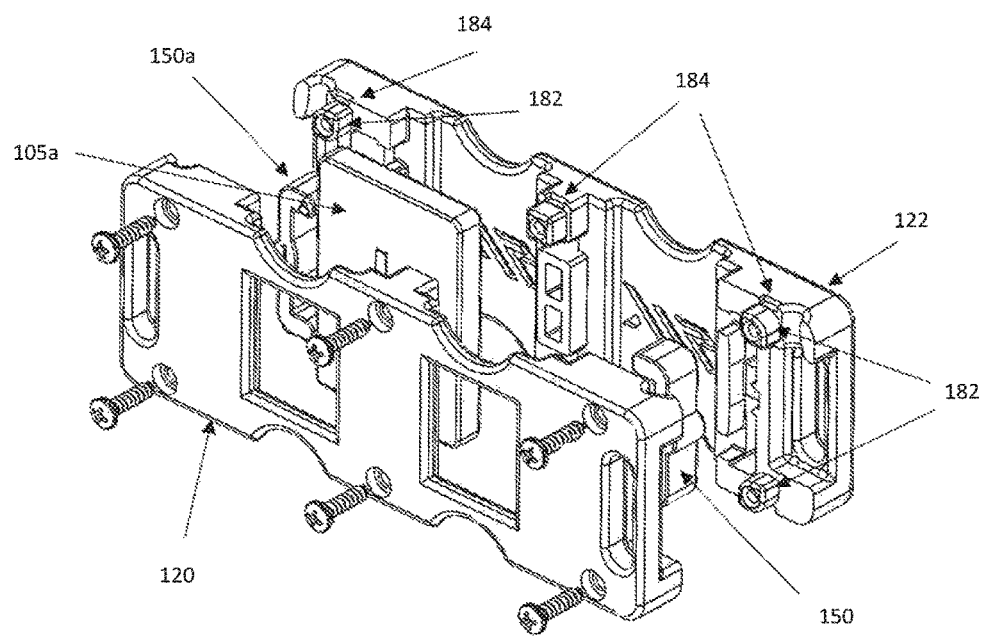
FIG. 8 depicts an exploded view of a marking device with the holder shown in FIG. 1 with a wide marker.

As shown in FIGS. 7-9, a holder 100 may be provided that may secure a wider marker 105a with a first tension mechanism 150a and the center support 172. The wider marker 105a may abut the two prongs 162 of the first tension mechanism 150a and the center support 172. However, a thin marker 105b may not be wide enough to abut both the first tension mechanism 150a and the center support 172. Thus, a spacer 170 may be mounted on the center support 172 to decrease the width 194 across the channel 110.

Additionally, the width 194 across the channel 110 may also be decreased by changing out the first tension mechanism 150a with a different sized second tension mechanism 150b.

Figure 11:
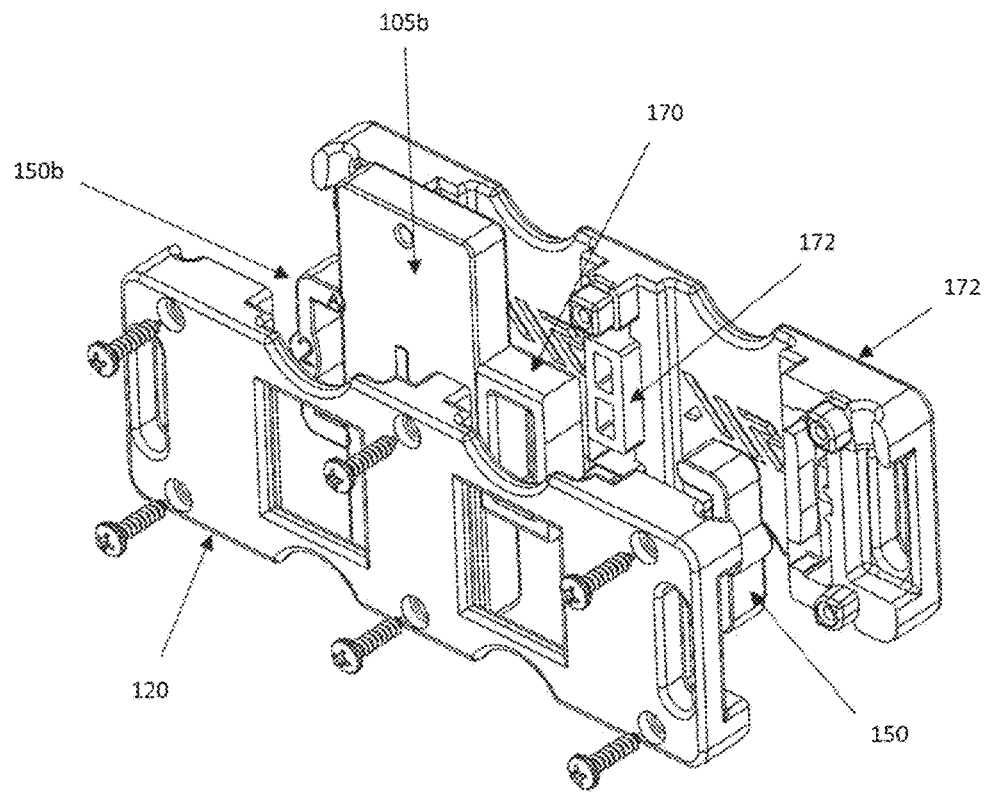
FIG. 11 depicts an exploded view of a marking device with the holder shown in FIG. 1 with a narrower and thicker marker.
Figure 12:
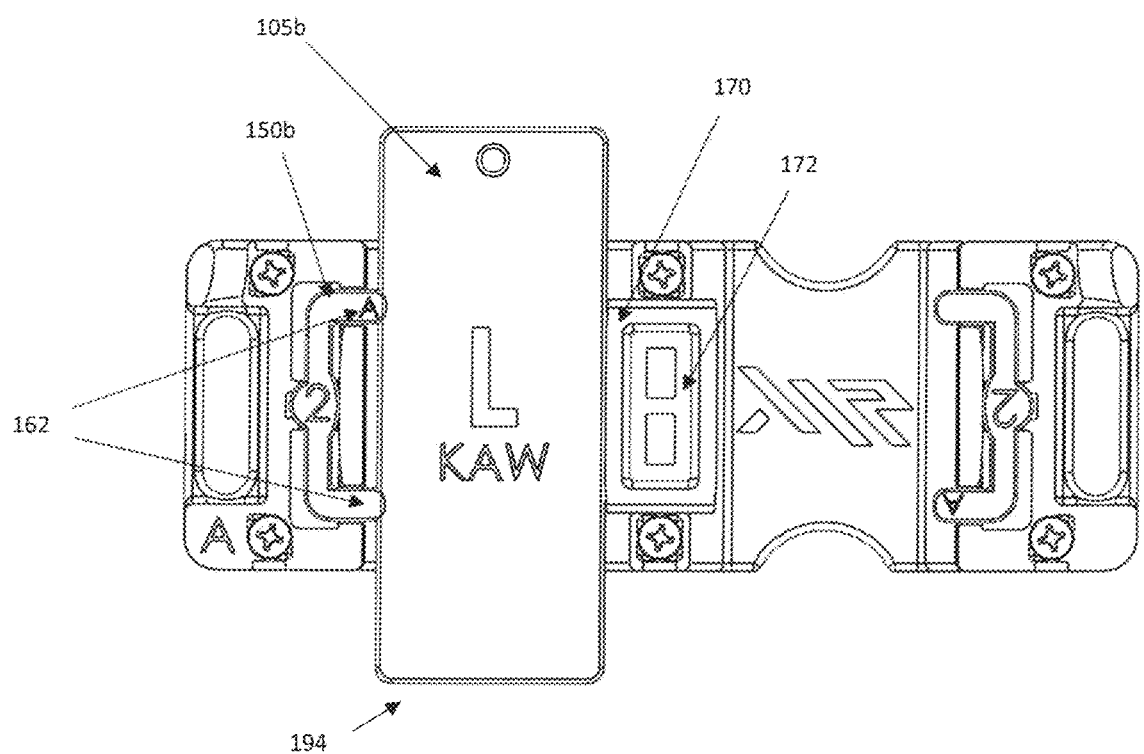
FIG. 12 depicts a front view of a marking device with the holder shown in FIG. 1, illustrating the inner assembly of the back panel with a narrower and thicker marker fully inserted in a channel.

As shown in FIGS. 11 and 12, a thinner marker 105b is secured with a holder 100 having a spacer 170 and a second tension mechanism 150b. The spacer 170 may be mounted on the center support 172. As shown in FIG. 12, the spacer 170 may extend around the perimeter of the center support 172 and decrease the width 194 across the channel 110. The spacer 170 may be changeable allowing for repeated mounting and removal. Additionally, a second tension mechanism 150b may be interchanged with the first tension mechanism 150a, decreasing the width 194 across the channel 110.

Furthermore, a holder 100 may be adjusted for a variety of different sizes of X-ray markers 105. Spacers 170 may be provided in a variety of different thicknesses. Similarly, the tension mechanisms 150 may come in a variety of sizes. Further the different sizes of spacers 170 and tension mechanisms 150 may be intermixed to accommodate an even greater number of X-ray marker 105 sizes. For example, the first tension mechanism 150a may be used with a spacer 170 to accommodate an intermediate sized marker 105. The present invention encompasses providing a holder 100 with a variety of different sized spacers 170 and tension mechanisms 150. Below is an example of a table providing a variety of combinations that may be utilized for different sized markers 105.

| Tension Mechanism | Spacer | Nominal W (in) | Width (in) | Nominal T (in) | Thickness (in) | Height (in) |
|---|---|---|---|---|---|---|
| 1 | None | 1 or 16/16 | 1 | 5/32-1/4 | 0.164-0.23 | 1 1/8+ |
| 1 | 1 | 13/16 | 0.82 | 5/32-1/4 | 0.164-0.23 | 1 1/8+ |
| 2 | None | 15/16 | 0.94 | 5/32-1/4 | 0.164-0.23 | 1 1/8+ |
| 2 | 1 | 7/8 or 14/16 | 0.865 | 5/32-1/4 | 0.164-0.23 | 1 1/8+ |

Additionally, a holder 100 may include a means for detaching the front panel 120 from the back panel 122 to access the center support 172 and tension mechanisms 150. The center support 172 and tension mechanisms 150 may be enclosed within the holder 100, so a means to access these parts may be required. When detached, the center support 172 and tension mechanisms 150 may be adjusted.

Figure 3:
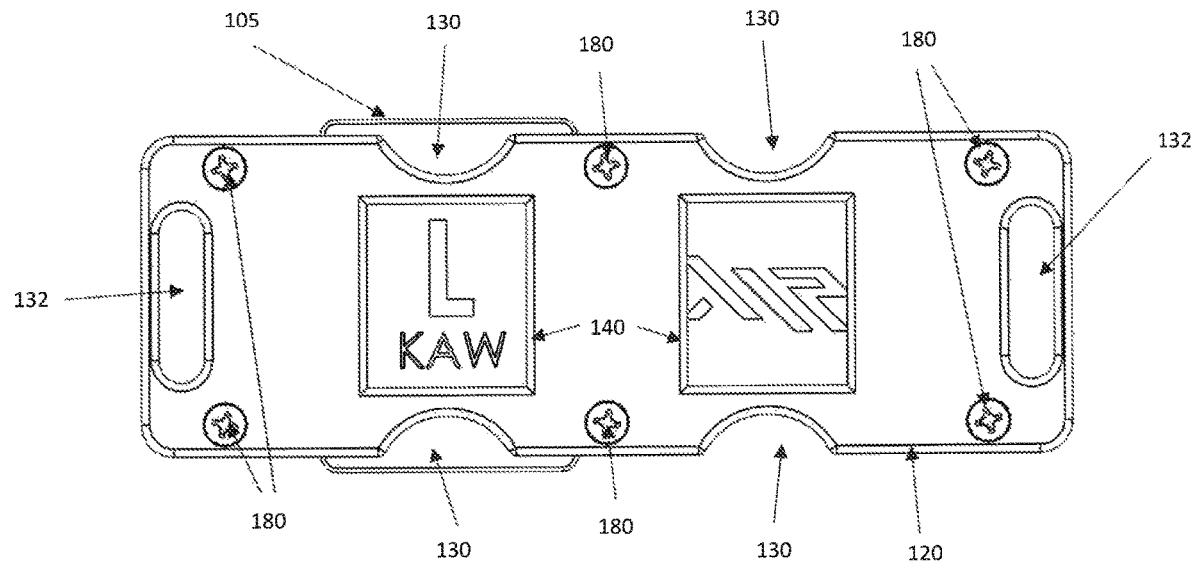
FIG. 3 depicts a front view of the marking device with the holder shown in FIG. 1, illustrating a front panel with two (2) openings.
Figure 5:
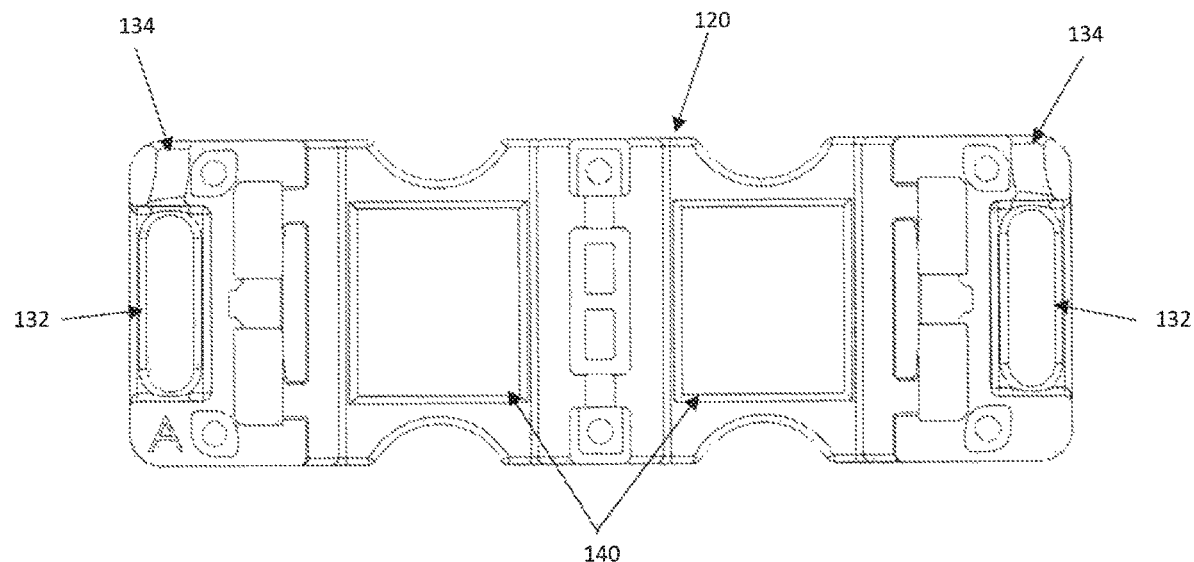
FIG. 5 depicts a front view of the interior of the holder shown in FIG. 1, illustrating the inner wall of the front panel.

In one embodiment, the front panel 120 may connect to the back panel 122 via at least one screw 180. As shown in FIG. 3, six (6) screws 180 may be used in one representative embodiment. At least one screw 180 may travel through the front panel 120 into a connecting screw hole in the back panel 122. Additionally, alignment aids 182 protruding from the back panel 122 may aid in aligning and reattaching of the holder 100, as shown in FIG. 8. Further, as shown in FIG. 5, the front panel 120 may include extensions outlining the interface of the back panel 122. The interface of the back panel 122 inserts into the outline of the front panel 120 with a 0.006 clearance to align the front panel 120 and back panel 122. The holder 100 may also include pry slots 184 to provide a technologist with a notch to grip when detaching the front panel 120 and back panel 122. Other means of providing a detachable connection for the front panel 120 and the back panel 122 may include a snap fit, a clip, a latch, or some other means known in the art.

Figure 13:
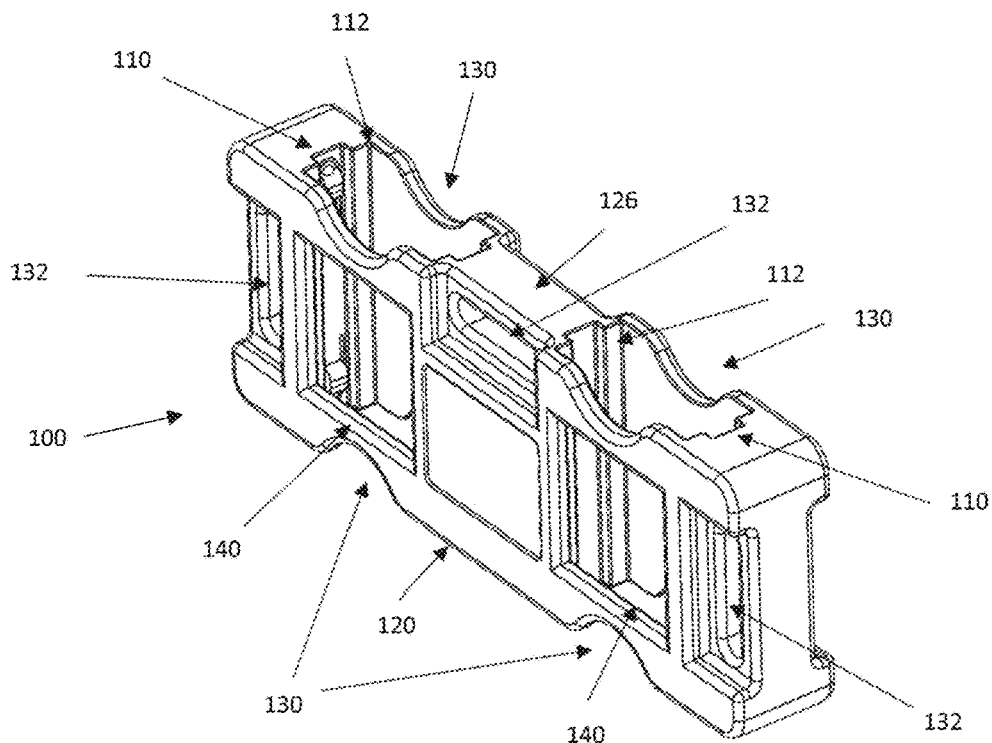
FIG. 13 depicts an isometric view of another embodiment of a holder.
Figure 14:
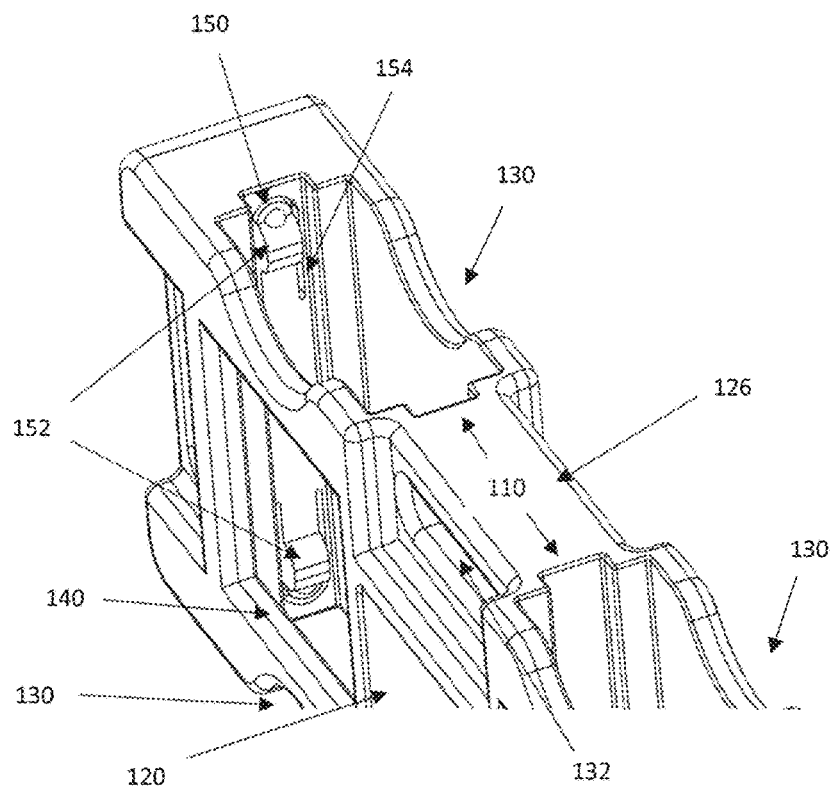
FIG. 14 depicts an isometric, close-up view of the holder shown in FIG. 13, illustrating a tension mechanism having a protrusion and cutout.

In a different embodiment, the holder 100 may include one or more protrusions 152 acting as a tension mechanism 150, as shown in FIGS. 13-14. Protrusions 152 may be included within a channel 110 near the top and/or bottom of the holder 100, as shown in FIG. 14. The protrusions 152 may be included within the channel 110 on any inner wall of the channel 110 in the interior 114 of the holder 100. When an X-ray marker 105 is inserted into a channel 110, the one or more protrusions 152 may contact the marker 105. This contact may produce a stabilizing force, such as friction, between the holder 100 and the marker 105 to hold or otherwise secure the marker 105 in place within the channel 110. The stabilizing force may not be so great though as to prevent the movement of a marker 105 when a technologist attempts to remove the marker 105 from the holder 100.

The size of a tension mechanism 150 or protrusion 152 may vary between different embodiments. Further, a tension mechanism 150 may be located on only one side of a channel 110 or may be located on multiple sides of a channel 110. A tension mechanism 150 may be located on any inner wall of a channel 110 or on any inner wall of a holder 100. Additionally, any number of tension mechanisms 150, such as protrusions 152, may be located on a single inner wall of a channel 110.

A holder 100 may also include a cutout 154 near a protrusion 152. As shown in FIG. 14, a cutout 154 is a groove in the inner surface of the holder 100 and may surround a protrusion 152. In an embodiment in which a holder 100 is made of plastic or some other ductile material, a cutout 154 may place tension on an X-ray marker 105 when inserted in the holder 100. When a marker 105 abuts a protrusion 152, the plastic or ductile material around the cutout 154 may flex. This flexion may place tension, a stabilizing force, on the marker 105, causing the marker 105 to be held in place within the holder 100.

Other embodiments may include other means to place a stabilizing force, such as tension, pressure, friction, or other similar force, on an X-ray marker 105 with a tension mechanism 150. For example, the tension mechanism 150 may include a spring force that pushes or pulls on an X-ray marker 105.

As illustrated in FIG. 3, the holder 100 may include a front panel 120. The front panel 120 may be connected to a back panel 122. A separating section 126 may also connect the front panel 120 and the back panel 122. The front panel 120 and the back panel 122 may be substantially parallel with at least one channel 110 running between them. The space between the front panel 120 and the back panel 122 defines the interior 114 of the holder 100. Any space outside of the interior 114 of the holder 100 may be considered the exterior of the holder 100.

The front panel 120 may also include one or openings 140. Each opening 140 may correspond with a channel 110, overlaying at least part of the channel 110. An opening 140 may create a hole or a window through the front panel 120 and expose the interior 114 of the holder 100 and the corresponding channel 110 to the exterior of the holder 100.

An opening 140 may allow a technologist to view an X-ray marker 105 that is inserted in a holder 100. When a marker 105 is inserted facing forward, a technologist may see what marker 105 is inserted in a channel 110 through an opening 140. For example, in an embodiment with two (2) channels 110, a technologist may insert an "L" marker 105 and an "R" marker 105 in the channels 110. With an opening 140 overlaying each channel 110, the technologist may see which channel 110 holds the "L" or "R" marker 105 without having to remove the markers 105 from the holder 100. This may improve efficiency when using the markers 105. Other embodiments may alter an opening 140 to include a window, a see-through screen, or some other means to view an inserted marker 105. An opening 140 may be rectangular, round, or any other shape. Additionally, an identifying symbol may be printed on the inner wall of the back panel 122 and may be seen through an opening 140 having an empty channel 110. The identifying symbol may identify the manufacturer via name, trademark, or some other means.

Figure 4:
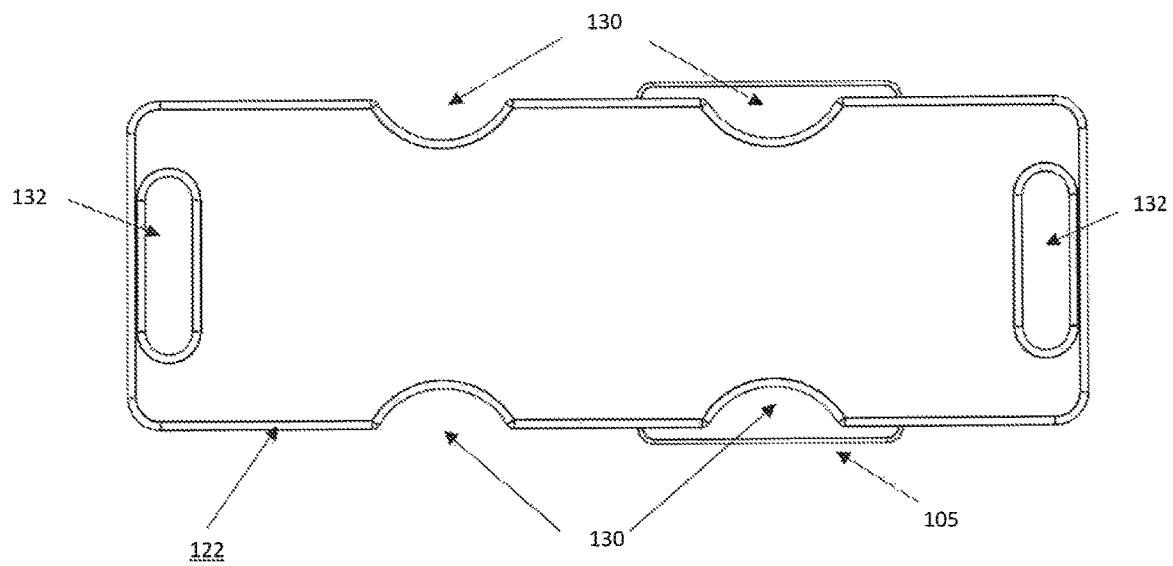
FIG. 4 depicts a back view of the marking device with the holder shown in FIG. 1, illustrating a solid back panel.

As illustrated in FIG. 4, a holder 100 may include a back panel 122. The back panel 122 may be solid without any holes through the back panel 122 to the interior 114 of the holder 100. The solid back panel 122 may be beneficial for the sanitation of an X-ray marker 105. Generally, double-sided tape is applied to the back side of an X-ray marker 105 allowing the marker 105 to be attached to an imaging plate or some other surface. If a marker 105 is inserted into a holder 100 facing forward, the back of the marker 105 with the double-sided tape may face the solid back panel 122. The back panel 122 may effectively cover the double-sided tape. By doing so, the back panel 122 may reduce the accumulation of dirt, lint, and other microorganisms on the tape, improving sanitation.

Additionally, as shown in FIGS. 3 and 4, the front panel 120 and the back panel 122 may also include thumb notches 130. A thumb notch 130 may be a notch, cut-in, or some other absence of material in the top or bottom edge of the front panel 120 or back panel 122. Furthermore, each thumb notch 130 may correspond with a channel 110 being located near the top or bottom of the channel 110. A thumb notch 130 may be rounded, rectangular, or some other shape. In one embodiment, each channel 110 may include four (4) thumb notches 130: (i) one above the channel 110 on the front panel 120, (ii) one above the channel 110 on the back panel 122, (iii) one below the channel 110 on the front panel 120, and (iv) one below the channel 110 on the back panel 122.

A thumb notch 130 may allow for easier removal of an X-ray marker 105 from a holder 100. When an X-ray marker 105 is inserted into a holder 100, a thumb notch 130 may expose part of the marker 105. This may allow a technologist to easily push or pull the exposed marker 105 section, making it easier for a technologist to remove a marker 105 from a holder 100. By pushing or pulling on a marker 105 at the thumb notch 130, the marker 105 may begin to slide out of the holder 100. Once a marker 105 begins to slide out of a holder 100, more of the marker 105 may be exposed, which may make it easier to fully remove the marker 105.

Figure 2:
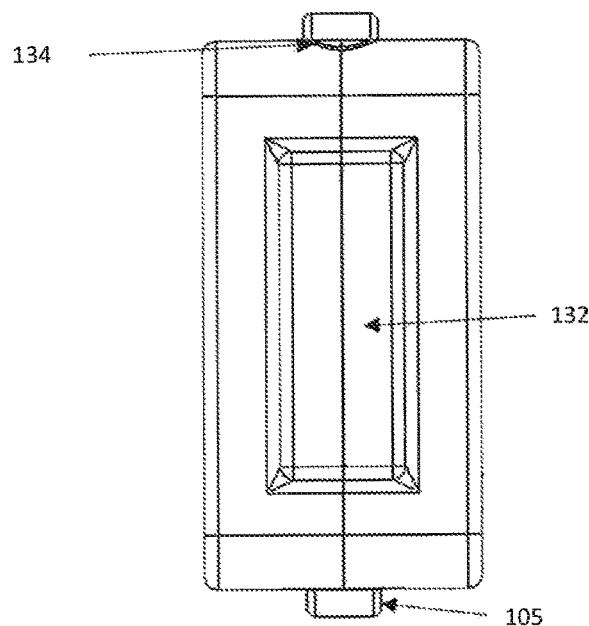
FIG. 2 depicts a side view of the marking device with the holder shown in FIG. 1, illustrating a reel slot.

As shown in FIGS. 2-4, the holder 100 may also include one or more reel slots 132. A reel slot 132 is a hole through the holder 100 that is separate from any channel 110. Because the reel slot 132 is separate from a channel 110, the reel slot 132 does not interfere with an X-ray marker 105 in the holder 100. A reel slot 132 may create a hole in the shape of an elongated ellipse, a circle, a rectangle, or some other shape. As illustrated in FIGS. 2-4, a reel slot 132 may be located on any side of a holder 100 and facing any direction.

A reel slot 132 may be used to attach the holder 100 to a person. Often technologists use retractable reels and badge straps in a healthcare setting. A reel slot 132 may allow a technologist to attach the holder 100 to a retractable reel or badge strap. In one embodiment, a holder 100 may include multiple reel slots 132, one on either side of the holder 100 and at least one in the middle of the holder 100. Having multiple reel slots 132 may allow for customized use of the holder 100. For example, a technologist may prefer to attach the holder 100 at a reel slot 132 on a particular side of the holder 100, such as to accommodate if the technologist is right or left-handed. Another technologist may prefer to attach the holder 100 using a middle reel slot 132.

Additionally, a holder 100 may include a key ring hole 134, which allows a technologist to attach the holder 100 to a key ring. The internal shape of the key ring hole 134 may be curved to accommodate for the circular nature of a key ring.

FIG. 1 depicts a holder 100 with two (2) channels 110 having an X-ray marker 105 inserted into one (1) channel 110. An opening 140 in the front panel 120 of the holder 100 exposes one side of the marker 105. A technologist may be able to see and identify the annotation on a marker 105 through the opening 140 while the marker 105 is stored in the interior 114 of the holder 100.

Further, thumb notches 130 and indents 112 in a holder 100 may make removing a marker 105 from a holder 100 easier for a technologist. An indent 112 may provide spacing or a gap between the front or back of a marker 105 and the inner walls of the front panel 120 or back panel 122. This spacing or gap may allow a marker 105 to more easily slide in and out of a holder 100. Additionally, a thumb notch 130 may expose a top or bottom portion of a marker 105 when the marker 105 is stored in the holder 100. A technologist may be able to grab or push this exposed portion to more easily remove the marker 105 from the holder 100.

Furthermore, as illustrated in FIG. 4, a solid back panel 122 may cover the back side of a marker 105. This may prevent the back of a marker 105, which generally holds double-sided tape, from being exposed to unnecessary dirt, lint, or microorganisms. The solid back panel 122 may help maintain a high quality of sanitation for the X-ray marker 105.

Figure 16:
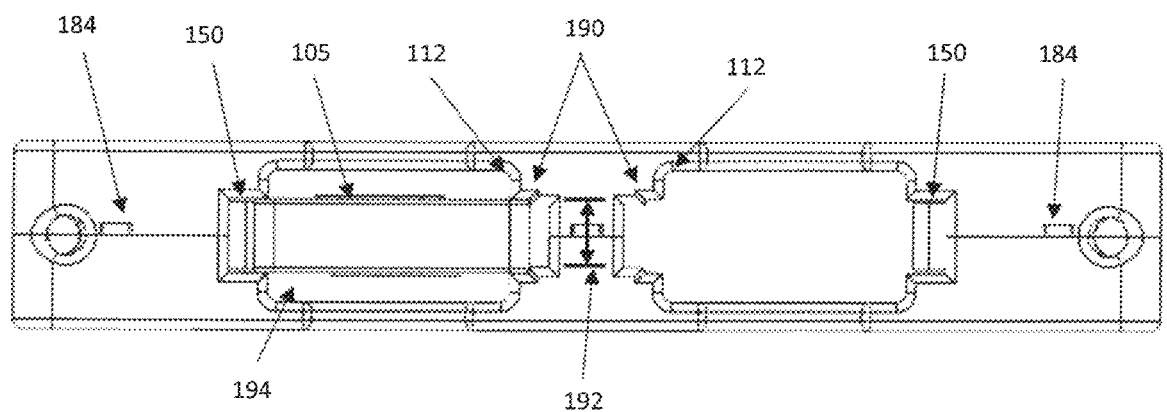
FIG. 16 depicts a top view of a marking device having another embodiment of a holder, illustrating a narrower and thicker marker inserted in a channel having a step.
Figure 17:
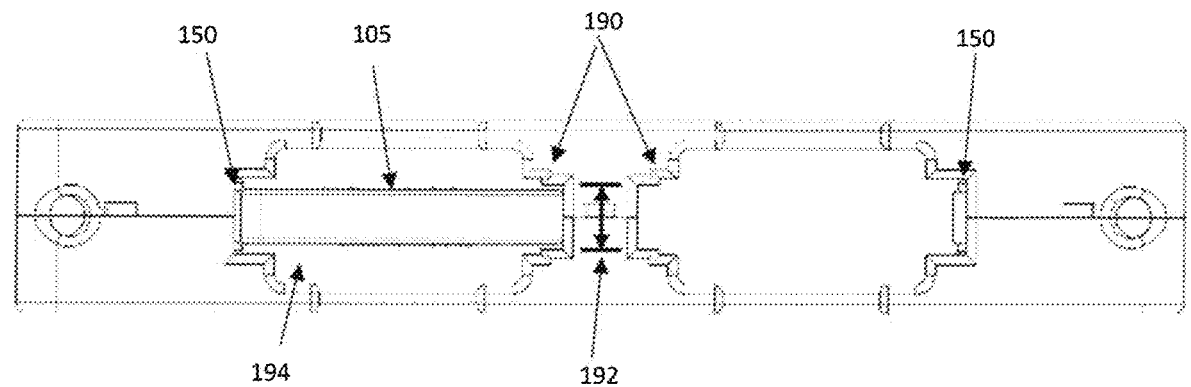
FIG. 17 depicts a top view of a marking device with the holder shown in FIG. 16, illustrating a thin and wide marker inserted in a channel having a step.

In yet another embodiment, the holder 100 includes a step 190 in the channel 110 that may reduce width 194 or depth 192 across the channel 110, as shown in FIGS. 16-17. The step 190 may project inwards toward the interior 114 of the holder 100. This causes the depth 192 across the channel 110 at the step 190 to decrease. Additionally, the width 194 across the channel 110 may also decrease in the sense that marker 105 that is thicker than the depth 192 at the step 190 abuts the step 190. As shown in FIG. 16, a thicker and narrower marker 105, in comparison to other markers 105, may be inserted into a channel 110 having a step 190. However, a marker 105 that is not as thick as the depth 192 at the step 190, does not abut the step 190 and utilizes the full width 194 across the channel 110. As shown in FIG. 17, a thinner and wider marker 105, in comparison to other markers 105, may also be inserted into the same channel 110 having a step 190. This embodiment may be useful to accommodate different sized markers 105 without requiring adjusting the size of the channel 110.

Figure 18:
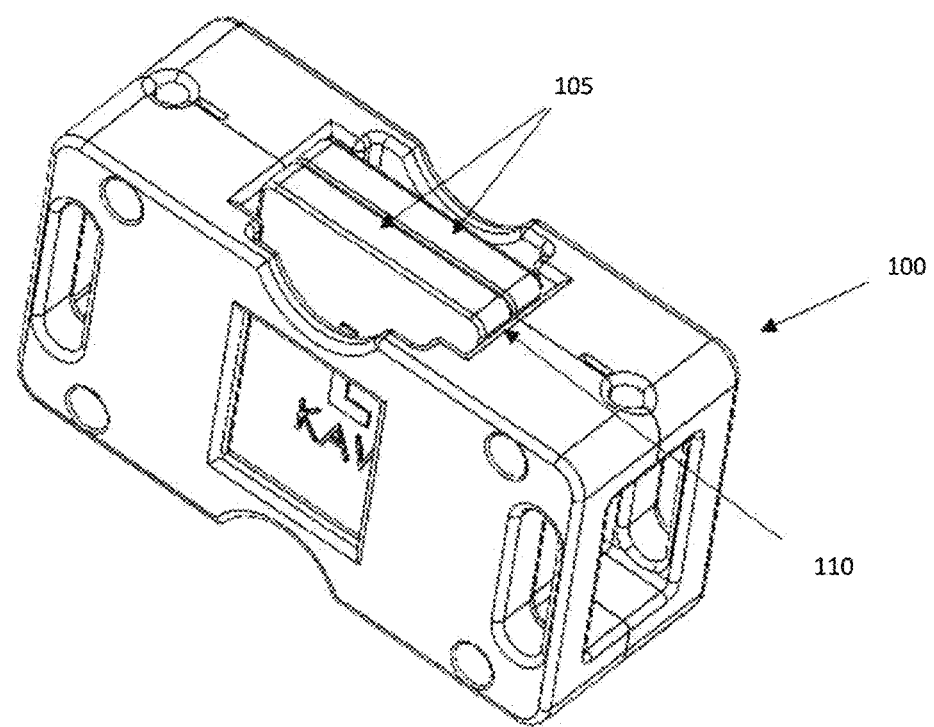
FIG. 18 depicts an isometric view of a marking device having another embodiment of a holder, illustrating two markers inserted in one channel.

As shown in FIG. 18, yet another embodiment may include a holder 100 capable of carrying more than one marker 105 in a single channel 110. The channel 110 may be sized to allow two or more markers 105 stacked on each other to be slid in and out of the channel 110. The holder 100 may include one or more tension mechanisms 150 to secure both markers 105 in the channel 110. Because the markers 105 generally contain tape on one side, a technologist may choose to stack the markers 105 so the taped sides do not contact each other.

A holder 100 may be made of a variety of materials. Plastic may be a preferred material because plastic is cheap but durable for the everyday use of a holder 100. Additionally, properties of plastic may allow flexion that improves the ability of a tension mechanism 150 to hold a marker 105 in place. Plastic may also allow a holder 100 to be easily disinfected with soap and water or rubbing alcohol. Additionally, the holder 100 may be 3D printed using a variety of different plastic filaments. Other embodiments of the holder 100 may be made of metal, a composite, or some other material.

Additionally, a holder 100 may be produced in a variety of different sizes. A holder 100 may be sized to match the size of a corresponding X-ray marker 105. Because markers 105 vary in size, a holder 100 may vary in size as well.

A holder 100 may help a technologist in the method of storing and utilizing X-ray markers 105. Generally, technologists are frequently required to use X-ray markers 105 throughout a day. The most common X-ray markers 105 are an "L" and "R" annotating left and right and may be personalized with a technologist's initials. Some type of double-side tape, often reusable and washable, is typically applied to the back of markers 105 so a technologist may attach the X-ray marker 105 to an imaging plate or some other surface, such as a detector, receptor, a wall, a table, or a patient. Other embodiments may include different means of attaching a marker 105 to an imaging plate or different attaching surfaces.

A process for using an X-ray marker 105 may include a technologist having an X-ray marker 105 with some means of attaching the marker 105 to a surface. The technologist may attach an X-ray marker 105 to a surface, such as an imaging plate. The technologist may perform an X-ray while the marker 105 is on the surface. Next, the technologist may remove the marker 105 from the surface. Once the marker 105 is removed, a technologist may slide the X-ray marker 105 inside a channel 110 of a holder 100. Then, the technologist may move to a second location, transporting the holder 100 and the X-ray marker 105 with them. At the second location, the technologist may slide the X-ray marker 105 out of the channel 110 and attach the marker 105 to a second surface. The technologist then may perform a second X-ray.

When using the holder 100, the technologist may attach the holder 100 to a keychain, key ring, retractable reel, or a badge strap. The technologist may also adjust the size of the channel 110 as previously described in the present invention to use a different X-ray marker 105 having different dimensions. After adjusting the size of the channel 110, the technologist may insert this different sized marker 105 in the channel 110 to secure the marker 105.

Thus, the holder 100 allows a technologist to easily store and transport an X-ray marker 105 between uses. Additionally, the holder 100 provides easy access to a marker 105 when a marker 105 is needed. Unlike attaching markers 105 to ID badges or other sheets of plastic, a holder 100 is only touched or grabbed when an X-ray marker 105 is needed and is not subject to routine wear and tear from continuous removal and reattaching.

In another embodiment, a holder 100 may stay in one location for multiple uses of an X-ray marker 105. In some scenarios, markers 105 are kept in exam rooms rather than traveling with a technologist. For example, in orthopedic departments, an X-ray marker 105 designating "standing" (meaning the X-ray was performed with the patient standing) may be kept in an orthopedic exam room. In such a case, a holder 100 may be attached to a surface in the exam room. The solid back panel 122 may allow for double-sided tape to be easily applied to the back of the holder 100. Thus, the holder 100 may be attached to a piece of equipment, a window, or some other surface.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape, and assembled in virtually any configuration. Furthermore, all the disclosed features of each disclosed embodiment can be combined with, or substituted for, the disclosed features of every other disclosed embodiment except where such features are mutually exclusive.

We claim:

1. A holder for an X-ray marker comprising:
a front panel;
a back panel connected to the front panel;
a channel between the front panel and the back panel defining an interior of the holder;
the channel sized such that the X-ray marker slides into and out of the channel; and
an at least one tension mechanism comprising at least two prongs extending from a base and positioned such that the at least two prongs abut the X-ray marker when the X-ray marker is inserted in the channel.

2. The holder of claim 1, further comprising:
a first prong;
a second prong;
a pocket of space surrounding the tension mechanism allowing the first prong to recess within the pocket of space when the first prong abuts the X-ray marker and the second prong does not abut the X-ray marker.

3. The holder of claim 1, further comprising:
a second tension mechanism having different dimensions than the at least one tension mechanism;
a means to replace the at least one tension mechanism with the second tension mechanism changing a width of the at least one channel.

4. The holder of claim 1, further comprising:
at least two channels; and
a separating section that divides the at least two channels from each other.

5. The holder of claim 4, further comprising:
a center support within the separating section; and
a changeable spacer that reduces a width of the at least one channel when the spacer is mounted on the center support.

6. The holder of claim 1, further comprising:
a second X-ray marker; and
the channel sized such that the X-ray marker stacked on the second X-ray marker slides in and out of the channel.

7. The holder for an X-ray marker of claim 1, wherein the prongs extend from opposite ends of the base.

8. The holder for an X-ray marker of claim 7, wherein the prongs extend in a parallel direction.

9. The holder for an X-ray marker of claim 8, wherein the tension mechanism has a radius that protrudes in the opposite direction of the prongs.

10. The holder for an X-ray marker of claim 9, wherein the tension mechanism is configured to rotate.

11. A method for using an X-ray marker comprising:
providing an X-ray marker;
attaching the X-ray marker to a first surface at a first location;
removing the X-ray marker from the first surface;
inserting the X-ray marker into a channel of a holder such that the X-ray marker is secured in the channel;
abutting the X-marker with a tension mechanism when the X-marker is inserted in the channel, wherein the tension mechanism has at least two prong tending from a base and positioned such that the at least two prongs abut the X-ray marker the X-ray marker is inserted in the channel;
transporting the holder with the X-ray marker in the channel from the first location to a second location;
removing the X-ray marker from the channel of the holder; and
attaching the X-ray marker to a second surface.

12. The method of claim 11, further comprising:
performing a first X-ray on the first surface when the X-ray marker is attached to the first surface;
performing a second X-ray on the second surface when the X-ray marker is attached to the second surface.

13. The method of claim 11, further comprising:
attaching the holder to at least one of the group of a keychain, key ring, a retractable reel, and a badge strap.

14. The method of claim 11, further comprising:
providing a second X-ray marker having different dimensions than the X-ray marker;
adjusting a size of the channel of the holder; and
inserting the second X-ray marker in the channel of the holder such that the second X-ray marker is secured in the channel.

15. A marking device for a medical diagnostic image comprising:
a) an X-ray marker;
b) a holder comprising:
a front panel;
a back panel parallel to the front panel;
a channel between the front panel and the back panel defining an interior of the holder;
a perimeter of the interior being marginally larger than the X-ray marker such that the X-ray marker may be inserted in the interior of the holder and removed from the interior of the holder; and
an at least one tension mechanism having at least two prongs extending from a base and positioned to secure the X-ray marker in the channel of the holder.

16. The marking device of claim 15, further comprising:
the tension mechanism having a first prong and a second prong; and
a pocket of space surrounding the tension mechanism allowing the base to rotate such that when the X-ray marker abuts the first prong but does not abut the second prong, the first prong recesses in the pocket of space.

17. The marking device of claim 15, further comprising:
at least two channels; and
a separating section that separates the at least two channels.

18. The marking device of claim 17, further comprising:
a center support within the separating section that abuts the X-ray marker when the X-ray marker is inserted in the interior of the holder;
a second X-ray marker having a lesser width than the X-ray marker; and
a changeable spacer mounted on the center support that reduces a width in the interior of the holder such that the second X-ray marker abuts the spacer and may be inserted in the interior of the holder and removed from the interior of the holder.

19. The marking device of claim 18, further comprising:
a means for detaching the front panel and the back panel to access the center support and the spacer.

20. The marking device of claim 15, further comprising:
a width across the channel; and
a step within the channel to narrow the width across the channel or the depth across the channel at the step.

\* \* \* \* \*